Oct. 9, 1951     L. J. E. A. DODIN     2,570,654
STEREOSCOPIC MOTION-PICTURE SYSTEM
Filed Nov. 13, 1947     3 Sheets-Sheet 1

Oct. 9, 1951     L. J. E. A. DODIN     2,570,654
STEREOSCOPIC MOTION-PICTURE SYSTEM
Filed Nov. 13, 1947     3 Sheets-Sheet 2
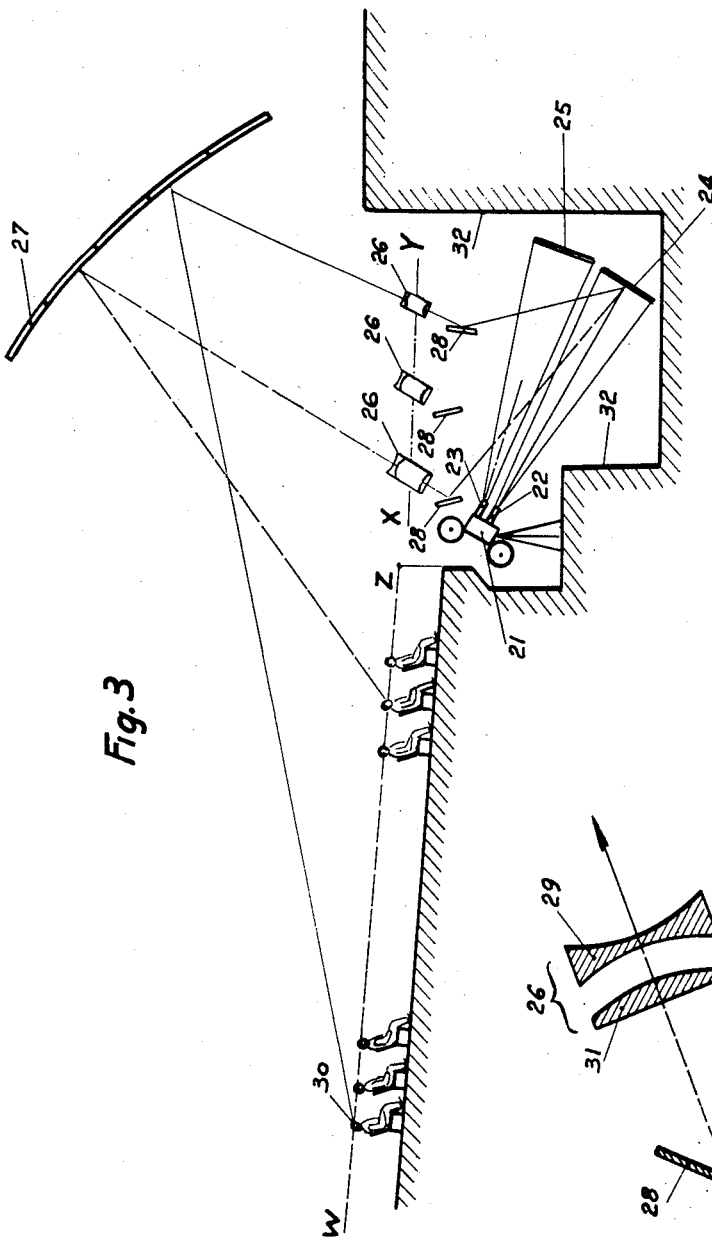
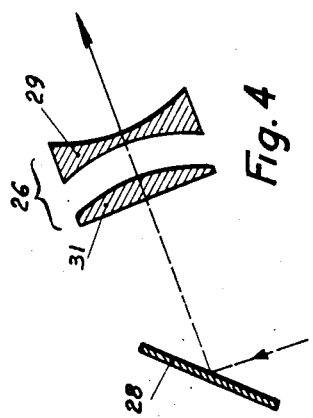

Oct. 9, 1951     L. J. E. A. DODIN     2,570,654
STEREOSCOPIC MOTION-PICTURE SYSTEM
Filed Nov. 13, 1947     3 Sheets-Sheet 3
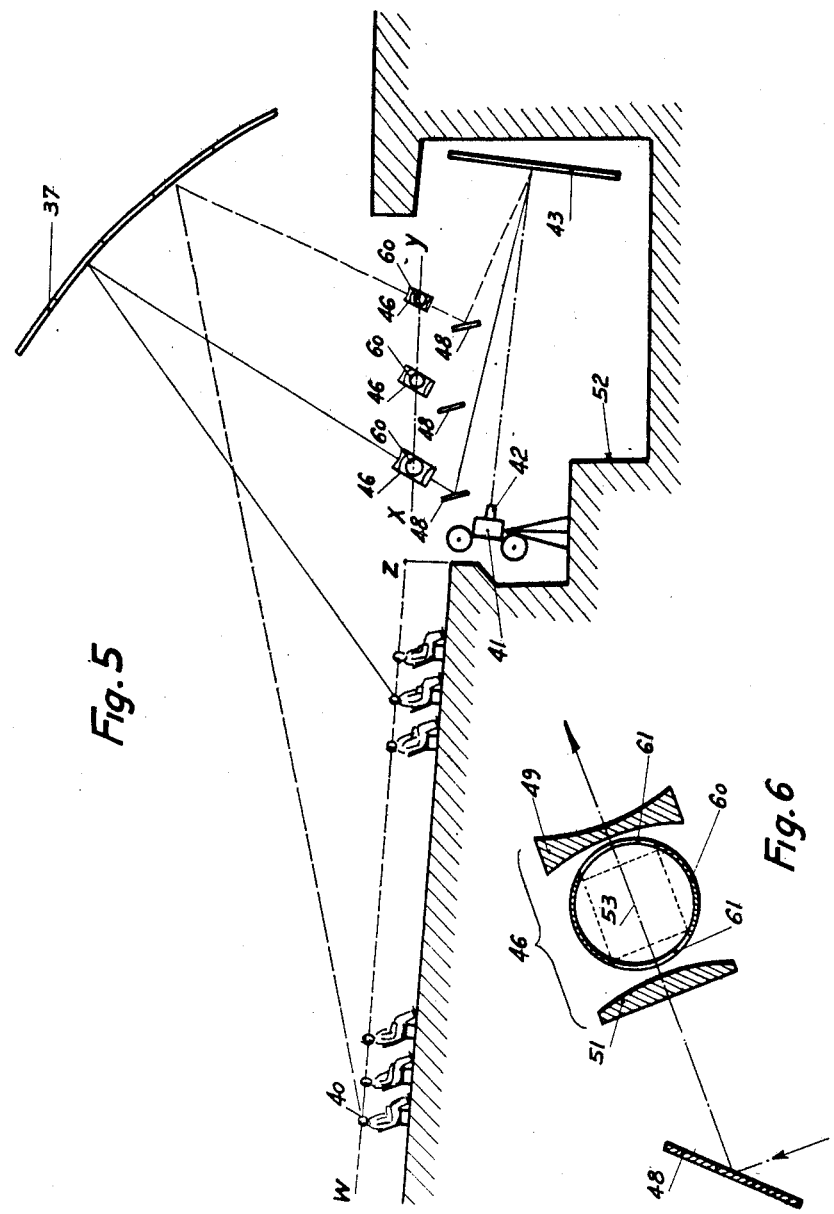

UNITED STATES PATENT OFFICE 2,570,654

STEREOSCOPIC MOTION-PICTURE SYSTEM

Lucien Jules Emile André Dodin,
Canet-Plage, France

Application November 13, 1947, Serial No. 785,655
In France October 14, 1946

Section 1, Public Law 690, August 8, 1946
Patent expires October 14, 1966

6 Claims. (Cl. 88—16.6)

The present invention aims to obtain stereoscopic or three-dimension motion pictures by projecting upon suitable screens ordinary positive motion-picture black-and-white or color films.

It is well known that fixed or stationary stereoscopic pictures are readily obtainable by means of what is called the stereoscopic couple which is constituted by two stationary images of an object or a scene, taken from different points of view and so located in front of two suitable optical means that each eye of the observer may see, through the respective optical means, only the image which is meant for it, the distance between the centers of said images and optical means being equal to that between the optical axes of the eyes of the observer, i. e. from 6 to 7 centimeters.

It is an object of the present invention to provide a stereoscopic motion-picture system in which successive stereoscopic couples of the kind above referred to, instead of being stationary, pass one after another and are projected, through appropriate optical devices substantially corresponding to above said optical means, in such a way that each eye of the observer may perceive only the image meant for it, picked up from each successive stereoscopic couple, the speed of said passage being so selected that, owing to the persistence of perceptions of the eye retina, the sensation of the continual motion and that of the stereoscopic effect will simultaneously be imparted to the eyes of an observer.

According to one feature of the present invention there is provided a method of obtaining stereoscopic motion pictures which comprises the steps of projecting simultaneously both right-eye image and left-eye image of each successive stereoscopic couple upon two auxiliary screens one of which corresponds to said right-eye image and the other to said left-eye image, passing the images thus projected through two adjustable optical devices one of which corresponds to said right-eye image and the other to said left-eye image, intercepting the images thus passed by means of a concave show-mirror so as to thereby reconstitute the same, and reflecting the latter from said mirror so that the reconstituted right-eye image may impinge on the right eye and left-eye image on the left eye of an observer.

According to a further feature of the present invention there is provided a method of obtaining stereoscopic motion pictures which comprises the steps of projecting upon a sole auxiliary screen at first one image and then the other image of each successive stereoscopic couple, passing from said screen first the first-mentioned image through an adjustable optical device corresponding to it and then the second-mentioned image through another adjustable optical device corresponding to the last-mentioned image, intercepting by means of a curved show-mirror first the first-mentioned image thus passed, so as to thereby reconstitute the same, and then the second-mentioned image thus passed so as to thereby reconstitute the same, and reflecting from said mirror first the first-mentioned image thus reconstituted so that it may impinge on one eye of an observer, and then the second-mentioned image thus reconstituted so that it may impinge on the other eye of said observer.

According to yet a further feature of the present invention there is provided a stereoscopic motion-picture installation suitable for carrying out the above methods, said installation comprising means whereby each image of each successively passing stereoscopic couple may be separately projected on auxiliary screening means adapted to emit each image thus projected, and means whereby each image thus emitted may be picked up and passed onto a show-screen adapted to reflect the same onto the corresponding eye of an observer.

In order that the invention may be well understood and readily carried into effect, the same will now be described with reference to the accompanying diagrammatic drawings which show by way of example some embodiments of the invention and in which:

Fig. 3 shows a further form of stereoscopic motion-picture installation according to the invention;

Fig. 4 is a form of picking-up device used in the installation shown in Fig. 3;

Fig. 5 shows yet a further form of stereoscopic motion-picture installation according to the invention; and Figs. 6 and 7 illustrate a form of picking-up device used in the installation shown in Fig. 5.

Figure 1:
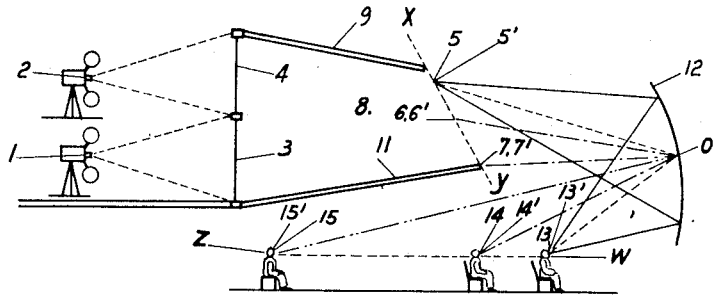
Fig. 1 shows a form of stereoscopic motion-picture installation according to the invention.

Referring to the drawings, two projection apparatus 1 and 2 (Fig. 1) are adapted to project simultaneously on two translucent auxiliary screens 3 and 4, respectively, successive stereoscopic couples of the kind above referred to. As shown, the screens 3 and 4 are disposed one under the other, but if desired they may be disposed one by the side of the other.

Figure 2:
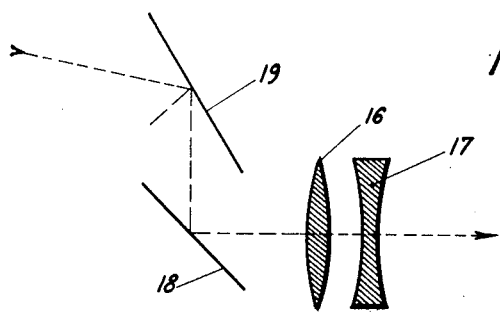
Fig. 2 is a form of picking-up device used in the installation shown in Fig. 1.

At a suitable distance from the screens 3 and 4 a series of picking-up devices such as shown in Fig. 2, hereinafter and in the appended claims called "vehicles," are disposed at 5, 6, 7, etc. (Fig. 1) and whose construction will be described hereinafter. Two such vehicles are provided for each observer, one for each eye, and all such vehicles are suitably disposed on a surface (whose line of intersection with the plane of the paper is XY) optically interconnected, in relation to a curved mirror 12, with another surface (whose line of intersection with the plane of the paper is ZW) which is approximately level with the eyes of observers. The whole is preferably isolated from the show-hall by means of opaque walls such as 9 and 11.

In these conditions, each pair of vehicles, for example 5 and 5' corresponding to the eyes 13, 13' of an observer, will form in cooperation with the curved mirror 12 two respective images having their centers distant about 7 cm. from each other and located on a horizontal line perpendicular to the vertical plane passing through the center 0 of mirror 12 and the middle point between 13 and 13'.

Similarly, to each pair of vehicles, such for example 6 or 7, there will correspond two images optically interconnected with the seats 14 and 15, respectively.

As any light rays passing through a vehicle pass also through the image carried by it, the eyes of observers will therefore receive the same impressions as they would receive if they were situated at the same points as the vehicles.

It is to be noted that the screens 3 and 4, instead of being translucent, may be opaque and reflecting, the projection apparatuses 1 and 2 being then disposed on the same side thereof as the vehicles.

In the present example (Figs. 1 and 2) each vehicle comprises a convergent lens 16 and a coaxial divergent lens 17, these two lenses being so selected and so adjustable with respect to each other that the ensemble thereof may have any desired focal distance. However, other forms of lenses may be employed and suitably disposed for example with a view to reducing, if so desired, dimensions of the auxiliary screens 3, 4 without reducing those of the images formed on the curved mirror 12.

The ensemble of lenses above referred to is provided with two oriental flat mirrors 18, 19 adapted, when adjusted and immobilized with the aid of suitable means (not shown), to send through said lenses onto the corresponding eye of an observer all light rays emitted by one of the auxiliary screens 3 and 4. For example, the mirrors 18, 19 of the vehicle 5 are so adjusted as to send onto 13 the light rays emitted by the secreen 4, while similar mirrors (not shown) of vehicle 5' are adjusted so as to send onto 13' the light rays emitted by the screen 3.

By suitably adjusting the convergency of each pair of vehicles each one of the two images conveyed thereby and formed on the respective portions of curved mirror 12 will be clear and clearly seen by the corresponding eye of the respective observer, wherefore both his eyes will get the sensation of the clear stereoscopic effect as if he looked at the very object or scene in point.

In order that the face of observer may be covered more largely by the light rays conveyed by respective vehicles, the vehicle lenses and mirrors may be made rectangular or square in contour. The images conveyed by each pair of vehicles and reflected by the curved mirror 12 onto the eyes of observer will then present two adjacent rectangles or squares having their centers removed horizontally from each other a distance substantially equal to the distance between human eyes, i. e. maximum 70 mm. Each observer will thus be allowed to move his head horizontally to the left or to the right half that distance and vertically up or down half that distance or more in the case of rectangles, so as to enable each of his eyes to pick up each corresponding image.

The concave mirror 12 may be constituted by a multiplicity of suitable light reflecting concave elements of any suitable contour assembled on a supporting structure in any convenient way. As the construction of this mirror forms no part of the present invention, the same will not be described in detail.

Nor will be described in detail the preparation of stereoscopic couples, as such preparation can be carried out in very many ways. It is only pointed out that the requisite successive couples may be obtained by taking motion pictures of the desired object or scene on two negative films being passed simultaneously for example by two parallelly disposed cameras synchronized with, and distance about 65 mm. from, each other, or else by two cameras facing each other and provided with total reflection prisms adapted to receive two parallel beams of light distant about 65 mm. from each other. A single camera may also be used having two parallel telescopes distant about 65 mm. from each other. The negatives thus obtained will then be printed on positives as usually, so as to obtain either horizontal or vertical successive stereoscopic couples ready for use in an installation according to the present invention.

The installation shown in Fig. 1 is applicable where a sufficient height of the show-hall is available. If such height is not available the installation according to the invention may be disposed in an orchestra pit 32, as shown in Fig. 3. In this embodiment there is at least one projecting apparatus 21 provided with two parallel telescopes 22, 23 adapted to project successive stereoscopic couples on two suitably inclined auxiliary screens 24 and 25, respectively, positioned one above the other.

As in the preceding embodiment, vehicles 26—two for each observer—are disposed on the surface XY optically interconnected with the surface WZ substantially level with the eyes of observers. Said successive stereoscopic couples simultaneously emitted by the auxiliary screens 24, 25 are picked up by corresponding pairs of vehicles 26 and conveyed by them onto the concave show-mirror 27 from which they are reflected onto corresponding pairs of eyes, such as those situated for example at 30, wherefore the latter simultaneously see in the mirror 27 stereoscopic pictures corresponding to flat pictures of said couples, as has been explained hereinabove.

Each vehicle 26 (Fig. 4) comprises a concave lens 29 and a convex lens 31, the ensemble 26 of which may be so adjusted as to have any desired focal distance. This ensemble of lenses is provided with a sole flat mirror 28 adapted to pick up images emitted by the auxiliary screens 24, 25 and send them through said ensemble of lenses. In all other respects and in operation the vehicles 26 are similar to those described in detail in connection with Figs. 1 and 2. In order to shelter all vehicles from dust, a suitable glass cover (not shown) may be extended over all of them.

Instead of a projecting apparatus having two parallel telescopes as shown in Fig. 3, use may of course be made of two synchronized apparatus of which one would pass for example right-eye images and the other left-eye images of successive stereoscopic couples. This applies particularly to "horizontal" stereoscopic couples, that is to say couples constituted by two films one of which comprises for example but right-eye images and the other but left-eye images. In the case of "vertical" stereoscopic couples, that is to say couples constituted by a single film in which between each two right-eye images there is interposed a left-eye image, one or two telescopes may obviously be used forming part of a sole projecting apparatus.

It is to be noted that the sense of passage of successive stereoscopic couples should be such as to prevent the images from being seen upside down.

Figure 7:
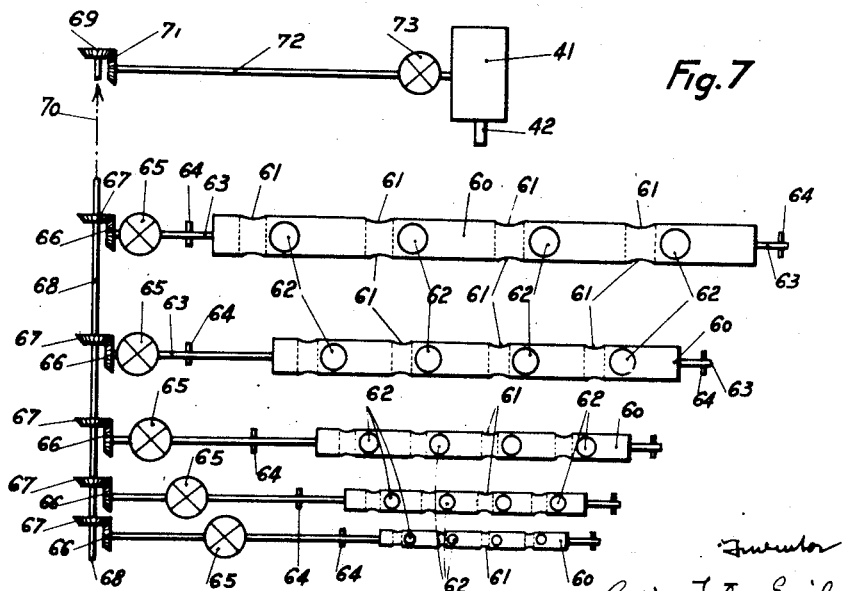

In Figs. 5, 6 and 7 is illustrated an example of installation in which the two auxiliary images of successive stereoscopic couples are projected alternately on a single auxiliary screen by means of a single projecting apparatus having a sole telescope, in such a way that the vehicles corresponding for example to the right eyes of observers are operative during the time of projection of a right auxiliary image on the auxiliary screen, while the vehicles corresponding to the left eyes of observers are inoperative or obturated during that time, and vice-versa, the images being thus alternated successively so that each eye of observer may receive only the impression that is meant for it.

A projecting apparatus 41 having a telescope 42 is adapted to project on an auxiliary screen 43 positive images of a film in which there are regularly alternated flat pictures of stereoscopic couples.

As previously, said images are picked up by flat mirrors 43 and sent through vehicles 46 onto the concave-show-mirror 37 from which they are reflected onto corresponding pairs of eyes, such as those situated for example at 40, wherefore the latter simultaneously see in the mirror 37 stereoscopic pictures corresponding to flat pictures of said couples, in the conditions explained in detail hereinabove. The ensemble of projecting apparatus, auxiliary screen, flat mirrors and vehicles is disposed in a pit 52 as before. The alternate obturation of each right or left series of vehicles may be brought about as follows:

Each series of vehicles corresponding to a row of observers is provided with a common obturator constituted by a rotatable tube 60 the axis of which intersects the optical axes of respective vehicles at points 53 lying substantially half-way between lenses 49, 51 of each vehicle 46.

Each tube 60 is provided with passages 61 (Figs. 6 and 7) corresponding for example to "right" vehicles of the row and, at right angles thereto, with passages 62 corresponding to "left" vehicles of that row. In order that twin-images conveyed by vehicles 46 and reflected by the show-mirror 37 into the fields of vision of the eyes of observers may be of same magnitude and conveniently situated, the volumes of vehicles and tubes 60 corresponding to various rows of observers are, in accordance with the optical laws, the greater the distance from the auxiliary screen 43, as is diagrammatically shown in Figs. 5 and 7, while the vehicles themselves (similar construction but different focal length) are more and more spaced as the said distance is greater. It results therefrom that, for a same number of observers per row, the tubes 60 are the smaller, both in length and in diameter, the smaller the distance from the auxiliary screen 43.

In order that the various vehicles may be either opened or obturated in accordance with the projected auxiliary images, the rotation of the tubes 60 is suitably synchronized with the projecting apparatus 41. Such synchronization may be brought about for example as follows: Each tube 60 is provided with shafts 63 that may be rotated in bearings 64 by an electromotor 65. Each motor 65 carries keyed to its shaft a bevel gear 66 meshing with a corresponding bevel gear 67 keyed to a common shaft 68. Preferably, synchronous motors are employed. The shaft 68 is suitably connected to drive a gear 69 meshing with a corresponding gear 71 keyed to the shaft 72 of the motor 73 actuating the projecting apparatus 41.

The connecting of the shaft 68 and gear 69 is diagrammatically represented by an arrow in dash-and-dot line 70. A flexible connecting of the shafts 68 and 72 may be used if these two shafts are not intersecting. This connecting assures the requisite synchronization of the projecting apparatus 41 with the ensemble of tubes 60. If the shafts 68 and 72 do intersect so that they may be directly interconnected for example by means of gears such as 69 and 71, the electromotors 65 may be omitted. Also, any other suitable means may be used for assuring said synchronization without departing from the invention itself.

From the optical point of view, the installation just described gives the same results as hereinbefore, since each eye of an observer perceives the image meant for it, picked up from each successive stereoscopic couple, the speed of passage thereof being so selected that, owing to the persistence of perceptions of the eye retina, the sensation of the continued motion and that of the stereoscopic effect are imparted simultaneously to the eyes of the observer.

It is to be understood that the invention is not limited to the partciular apparatus described and shown, nor to the particular methods set forth, as the same may be modified without substantially departing from the invention itself which is intended to be defined in the accompanying claims.

What I claim is:

1. An installation for simultaneous transmission of a pair of correlated stereoscopic images to a plurality of spaced stationary observation posts at each of which said pair of correlated images is to be observed by the eyes of a spectator, comprising in combination, screen means; means for projecting two correlated stereoscopic images on said screen means; a stationary reflector arranged so as to be directly visible from each of the observation posts; and a plurality of pairs of optical systems, each of said pairs of optical systems corresponding to one of the observation posts and each optical system including a plane mirror, said optical systems being arranged between said screen and said stationary reflector in such a manner that each of said pairs of optical systems reflects by means of the plane mirrors thereof the correlated stereoscopic images appearing on said screen onto said stationary reflector, said optical systems and said stationary reflector being constructed and shaped so that the two correlated stereoscopic images reflected by each pair of said optical systems are reflected and concentrated by said stationary reflector into the corresponding eyes of a spectator located at the observation post corresponding to said optical system.

2. An installation for simultaneous transmission of a pair of correlated stereoscopic images to a plurality of spaced stationary observation posts at each of which said pair of correlated images is to be observed by the eyes of a spectator, comprising in combination, screen means; means for projecting two correlated stereoscopic images on said screen means; a stationary concave reflector arranged so as to be directly visible from each of the observation posts; and a plurality of pairs of optical systems, each of said pairs of optical systems corresponding to one of the observation posts and each optical system including a plane mirror, said optical systems being arranged between said screen and said stationary concave reflector in such a manner that each of said pairs of optical systems reflects by means of the plane mirrors thereof the correlated stereoscopic images appearing on said screen onto said stationary concave reflector, said optical systems and said stationary concave reflector being constructed and shaped so that the two correlated stereoscopic images reflected by each pair of said optical systems are reflected and concentrated by said stationary concave reflector into the corresponding eyes of a spectator located at the observation post corresponding to said optical system.

3. An installation for simultaneous transmission of a pair of correlated stereoscopic images to a plurality of spaced stationary observation posts at each of which said pair of correlated images is to be observed by the eyes of a spectator, comprising in combination, screen means; means for projecting two correlated stereoscopic images on said screen means; a stationary concave reflector arranged in front of and above said observation posts so as to be directly visible from each of the observation posts; and a plurality of pairs of optical systems, each of said pairs of optical systems corresponding to one of the observation posts and each optical system including a plane mirror, said optical systems being arranged between said screen and said stationary concave reflector in such a manner that each of said pairs of optical systems reflects by means of the plane mirrors thereof the correlated stereoscopic images appearing on said screen onto said stationary concave reflector, said optical systems and said stationary concave reflector being constructed and shaped so that the two correlated stereoscopic images reflected by each pair of said optical systems are reflected and concentrated by said stationary concave reflector into the corresponding eyes of a spectator located at the observation post corresponding to said optical system.

4. An installation for simultaneous transmission of a pair of correlated stereoscopic images to a plurality of spaced stationary observation posts at each of which said pair of correlated images is to be observed by the eyes of a spectator, comprising in combination, screen means; means for projecting two correlated stereoscopic images on said screen means; a stationary concave reflector arranged in front of and above said observation posts so as to be directly visible from each of the observation posts; and a plurality of pairs of optical systems arranged in a plane, each of said pairs of optical systems corresponding to one of the observation posts and each optical system including a plane mirror, said optical systems being arranged between said screen and said stationary concave reflector in such a manner that each of said pairs of optical systems reflects by means of the plane mirrors thereof the correlated stereoscopic images appearing on said screen onto said stationary concave reflector, said optical systems and said stationary concave reflector being constructed and shaped so that the two correlated stereoscopic images reflected by each pair of said optical systems are reflected and concentrated by said stationary concave reflector into the corresponding eyes of a spectator located at the observation post corresponding to said optical system.

5. An installation for simultaneous transmission of a pair of correlated stereoscopic images to a plurality of spaced stationary observation posts arranged substantially in a plane at each of which said pair of correlated images is to be observed by the eyes of a spectator, comprising in combination, screen means; means for projecting two correlated stereoscopic images on said screen means; a stationary concave reflector arranged in front of and above said observation posts so as to be directly visible from each of the observation posts; and a plurality of pairs of optical systems arranged in a plane, each of said pairs of optical systems corresponding to one of the observation posts and each optical system including a plane mirror, said optical systems being arranged between said screen and said stationary concave reflector in such a manner that each of said pairs of optical systems reflects by means of the plane mirrors thereof the correlated stereoscopic images appearing on said screen onto said stationary concave reflector, said optical systems and said stationary concave reflector being constructed and shaped so that the two correlated stereoscopic images reflected by each pair of said optical systems are reflected and concentrated by said stationary concave reflector into the corresponding eyes of a spectator located at the observation post corresponding to said optical system, said screen means being arranged above the level of the plane of the observation posts and at right angles thereto, the plane of said optical systems being arranged so as to include an angle of substantially 45° with the plane of said observation posts.

6. An installation for simultaneous transmission of a pair of correlated stereoscopic images to a plurality of spaced stationary observation posts arranged substantially in a plane at each of which said pair of correlated images is to be observed by the eyes of a spectator, comprising in combination, screen means; means for projecting two correlated stereoscopic images on said screen means; a stationary concave reflector arranged in front of and above said observation posts so as to be directly visible from each of the observation posts; and a plurality of pairs of optical systems arranged in a plane, each of said pairs of optical systems corresponding to one of the observation posts and each optical system including a plane mirror, said optical systems being arranged between said screen and said stationary concave reflector in such a manner that each of said pairs of optical systems reflects by means of the plane mirrors thereof the correlated stereoscopic images appearing on said screen onto said stationary concave reflector, said optical systems and said stationary concave reflector being constructed and shaped so that the two correlated stereoscopic images reflected by each pair of said optical systems are reflected and concentrated by said stationary concave reflector into the corresponding eyes of a spectator located at the observation post corresponding to said optical system, said screen means being arranged below the level and in front of the plane of the observation posts, said optical systems being arranged substantially level with and in front of the observation posts.

LUCIEN JULES EMILE ANDRÉ DODIN.

REFERENCES CITED

The following references are of record in the file of this patent:

UNITED STATES PATENTS

| Number | Name | Date |
| --- | --- | --- |
| 1,349,018 | Terashima | Aug. 10, 1920 |
| 1,419,901 | Wyld | June 13, 1922 |
| 2,045,120 | Carpenter | June 23, 1936 |
| 2,063,989 | Du Mond | Dec. 15, 1936 |
| 2,252,467 | Luzzati | Aug. 12, 1941 |

FOREIGN PATENTS

| Number | Country | Date |
| --- | --- | --- |
| 2,118 | Great Britain | Jan. 20, 1895 |
| 12,797 | Great Britain | May 30, 1912 |
| 825,604 | France | Dec. 16, 1937 |